United States Patent
Chen et al.

(10) Patent No.: US 8,724,354 B2
(45) Date of Patent: May 13, 2014

(54) MULTI-PHASE INVERTER CONTROL DEVICE AND CURRENT CONTROL METHOD FOR THE SAME

(75) Inventors: Hung-Chi Chen, Hsinchu (TW); Wei-Yu Chen, New Taipei (TW)

(73) Assignee: National Chiao Tung University, Hsinchu (TW)

(*) Notice: Subject to any disclaimer, the term of this patent is extended or adjusted under 35 U.S.C. 154(b) by 179 days.

(21) Appl. No.: 13/446,470

(22) Filed: Apr. 13, 2012

(65) Prior Publication Data

US 2013/0182475 A1 Jul. 18, 2013

(30) Foreign Application Priority Data

Jan. 17, 2012 (TW) .............................. 101101735 A (51) Int. Cl.
*H02M 3/335* (2006.01)
*H02M 3/338* (2006.01)

(52) U.S. Cl.
USPC .......................................... 363/95; 363/131

(58) Field of Classification Search
USPC ................ 363/95, 97, 98, 131–133, 140, 65; 307/52, 55, 56, 60, 62, 82
See application file for complete search history.

(56) References Cited

U.S. PATENT DOCUMENTS

| | | | |
|---|---|---|---|
| 4,757,434 A * | 7/1988 | Kawabata et al. | 363/41 |
| 4,825,132 A | 4/1989 | Gritter | |
| 5,384,696 A * | 1/1995 | Moran et al. | 363/40 |
| 6,023,420 A * | 2/2000 | McCormick et al. | 363/131 |
| 6,414,853 B2 * | 7/2002 | Buckles et al. | 363/14 |
| 6,850,398 B2 | 2/2005 | Ciancio | |
| 6,984,960 B2 | 1/2006 | Stancu et al. | |
| 7,061,134 B2 | 6/2006 | Hiti et al. | |
| 7,072,195 B2 * | 7/2006 | Xu | 363/95 |
| 7,075,267 B1 | 7/2006 | Cheng | |
| 7,602,627 B2 * | 10/2009 | Ohshima et al. | 363/97 |
| 7,889,527 B2 * | 2/2011 | Ohshima et al. | 363/97 |
| 2002/0044472 A1 | 4/2002 | Arnet et al. | |

FOREIGN PATENT DOCUMENTS

TW I294717 B 3/2008

OTHER PUBLICATIONS

D.M. Brod and D.W. Novotny, "Current Control of VSI-PWM Inverters", IEEE Transactions on Industry Applications, vol. IA-21, No. 4, May 1985, pp. 562-570.
Z.J. Shen, Yali Xiong, Xu Cheng, Yue Fu and Kumar, P., "Power MOSFET Switching Loss Analysis: A New Insight", 41st IAS Annual Meeting on Industry Applications Conference, 8-12, pp. 1438-1442, Oct. 2006.

(Continued)

*Primary Examiner* — Adolf Berhane
*Assistant Examiner* — Nusrat Quddus
(74) *Attorney, Agent, or Firm* — Rosenberg, Klein & Lee (57) ABSTRACT

The present invention provides a multi-phase inverter control device and a current control method for the same. The multi-phase inverter control device comprises a discrete circuit receiving CT IOCCS, CT IOCS and CT LIVS, and converting them into a plurality of DT signals; a multi-dimensional quantization circuit calculating according to an MDFQCC (Multi-Dimensional Feedback Quantization Current Control) algorithm to obtain DT IOVS for determining a plurality of switching signals; a driver circuit receiving the switching signals, and converting the switching signals into a plurality of switch driving signals; and an inverter circuit receiving the switch driving signals to output voltage across the load. The present invention decreases switching frequency, reduces switching loss and controls the inverter to output current efficiently.

8 Claims, 5 Drawing Sheets

(56) References Cited

OTHER PUBLICATIONS

Jwu-Sheng Hu and Keng-Yuan Chen, "Multi-Dimensional Feedback Quantization Modulator Applied to the Control of Voltage Source Inverter," IEEE International Symposium on Industrial Electronics (ISIE), 5-8, pp. 1391-1396, Jul. 2009.

J.S. Hu, K.Y. Chen, T.Y. Shen and C.H. Tang, "Control of Voltage Source Inverter Using Multidimensional Feedback Quantization Modulator," IEEE Transactions on Industrial Electronics, vol. 58, No. 7, pp. 3027-3036, Jul. 2011.

Buso, S., et al.; "Uninterruptible power supply multiloop control employing digital predictive voltage and current regulators"; IEEE Transactions on Industry Applications; vol. 37, No. 6, pp. 1846-1854, Nov./Dec. 2001.

* cited by examiner

MULTI-PHASE INVERTER CONTROL DEVICE AND CURRENT CONTROL METHOD FOR THE SAME

BACKGROUND OF THE INVENTION

1. Field of the Invention

The present invention relates to an automatic control device, particularly to a device, which detects the deviations of an electric value with respect to one or several preset values from the output terminals and feeds back the deviations to the device so as to restore the measured electric value to the preset value.

2. Description of the Related Art

The conventional three-phase inverter control device normally alternately switches 6 transistors to output appropriate current according to switching signals generated by an SPWM (Sinusoidal Pulse Width Modulation) technology. However, the SPWM technology has lower energy efficiency and higher harmonic effect. Besides, the switching frequency is unable to vary in the SPWM technology once the carrier frequency has settled. Thus, the energy consumed in the switching activities of the transistors is unlikely to reduce. Therefore, the energy conversion efficiency of the conventional three-phase inverter control device is hard to promote.

Figure 1:
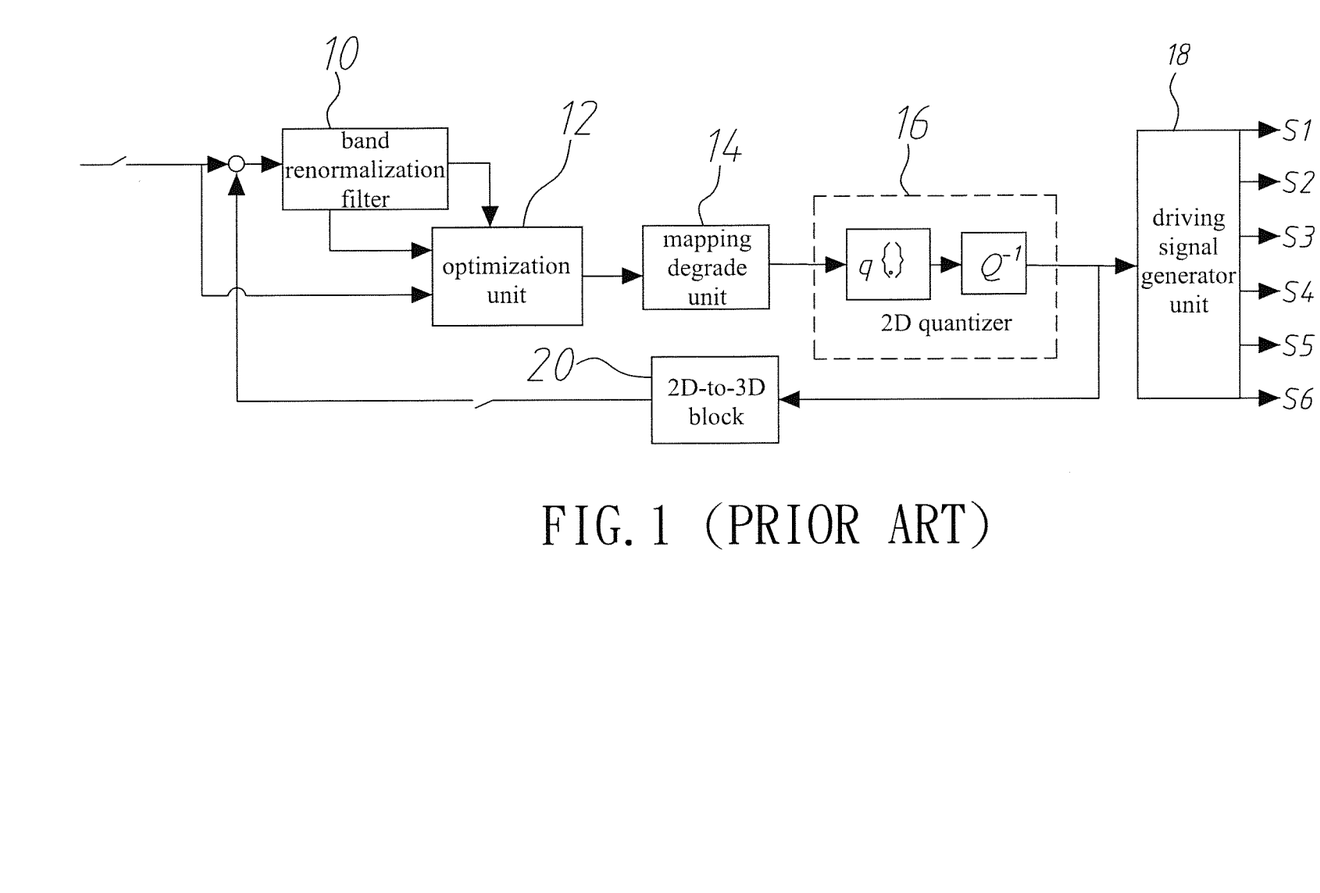
FIG. 1 schematically shows an MDFQM system.

A recent paper proposed an MDFQM (Multi-Dimensional Feedback Quantization Modulator) scheme to reduce the energy lost in the switching activities of the transistors of a multi-phase inverter. Refer to FIG. 1 a diagram schematically showing a conventional MDFQM system. The MDFQM system is involved with a method for controlling a multi-phase inverter and comprises a band renormalization filter 10, an optimization unit 12, a mapping degrade unit 14, a 2D quantizer 16, and a driving signal generator unit 18, and a 2D-to-3D block 20. The driving signal generator unit 18 is composed of three-arm inverters, which control the on/off of switches $S_1$-$S_6$ to output voltage and current.

Several indexes are used to evaluate an inverter control device, including voltage utilization ratio, harmonic distortion, and switching frequency. The voltage utilization ratio refers to the maximum amplitude of the AC voltage output by the control device. The harmonic distortion refers to the harmonic distortion of the current signal output by the control device. The switching frequency influences the efficiency of the multi-phase control device.

Neither the conventional MDFQM system nor the conventional SPWM system feeds back the current output by the inverter. The problem may be solved with a current control circuit, which is normally realized with a PI (Proportional Integral) controller or a PID (Proportional Integral Derivative) controller. However, the abovementioned controllers consume a great amount of computation resources. Further, they are likely to have phase lag or phase advance, depending on the load. Therefore, the solution does not perfectly control the current of an inverter.

Accordingly, the present invention proposes a multi-phase inverter control device and a current control method for the same to overcome the abovementioned problems.

SUMMARY OF THE INVENTION

The primary objective of the present invention is to propose a multi-phase inverter control device and a current control method for the same, wherein an optimization control method is used to generate signals switching transistors less frequently, and wherein a driver circuit drives an upper-arm switch and a lower-arm switch to control the current output by the inverter, whereby the inverter has better output current following performance, and whereby are overcome the problem that fixed switching frequency causes low efficiency and the problem that current phase lag causes system instability.

Another objective of the present invention is to propose a multi-phase inverter control device and a current control method for the same, wherein adoption of appropriate multi-dimensional quantization parameters leads to lower switching frequency and less computation resource consumption, and wherein application of more adjustable coefficients implements higher design flexibility and diversifies applications.

To realize the abovementioned objectives, the present invention proposes a multi-phase inverter control device, which is used to output voltages across at least one load that yields the continuous-time (CT) inverter output current signals (IOCS) in matrix and feeds the CT load-side inherent voltage signals (LIVS), and which comprises a discrete circuit receiving the CT inverter output current command signal (IOCCS), CT IOCS and CT LIVS, and converting them into a plurality of discrete-time (DT) signals; a multi-dimensional quantization circuit electrically connecting with the discrete circuit, receiving these DT signals, calculating according to an MDFQCC (Multi-Dimensional Feedback Quantization Current Control) algorithm, obtaining the desired DT inverter output voltages (IOV) and determining the six switching signals; a driver circuit electrically connecting with the multi-dimensional quantization circuit, receiving the switching signals, and converting the switching signals into a plurality of switch driving signals; and an inverter circuit electrically connecting the driver circuit and the load, and receiving the switch driving signals to drive the inverter, whereafter the load yields CT IOCS and CT LIVS to the discrete circuit.

The present invention also proposes a current control method for a multi-phase inverter control device, which comprises steps: receiving DT IOCCS, DT IOCS and DT LIVS;, calculating these DT signals according to an MDFQCC algorithm to select the optimal DT IOV and obtain the corresponding switching signals Below, the embodiments are described in detail in cooperation with the attached drawings to make easily understood the objectives, technical contents, characteristics and accomplishments of the present invention.

DETAILED DESCRIPTION OF THE INVENTION

Below, in cooperation with the drawings are described in detail the problems to be solved, the technical means to solve the problems, the efficacies of the solutions, and the embodiments, of the present invention. The present invention discloses an operation model and a circuit implementing the operation model, which are based on an MDFQCC (Multi-Dimensional Feedback Quantization Current Control) algorithm, wherein optimized switching signals are worked out according to a current error energy optimization method to generate current of a multi-phase inverter, responding to variable-frequency and variable-amplitude inverter output current commands of the multi-phase inverter.

Figure 2:
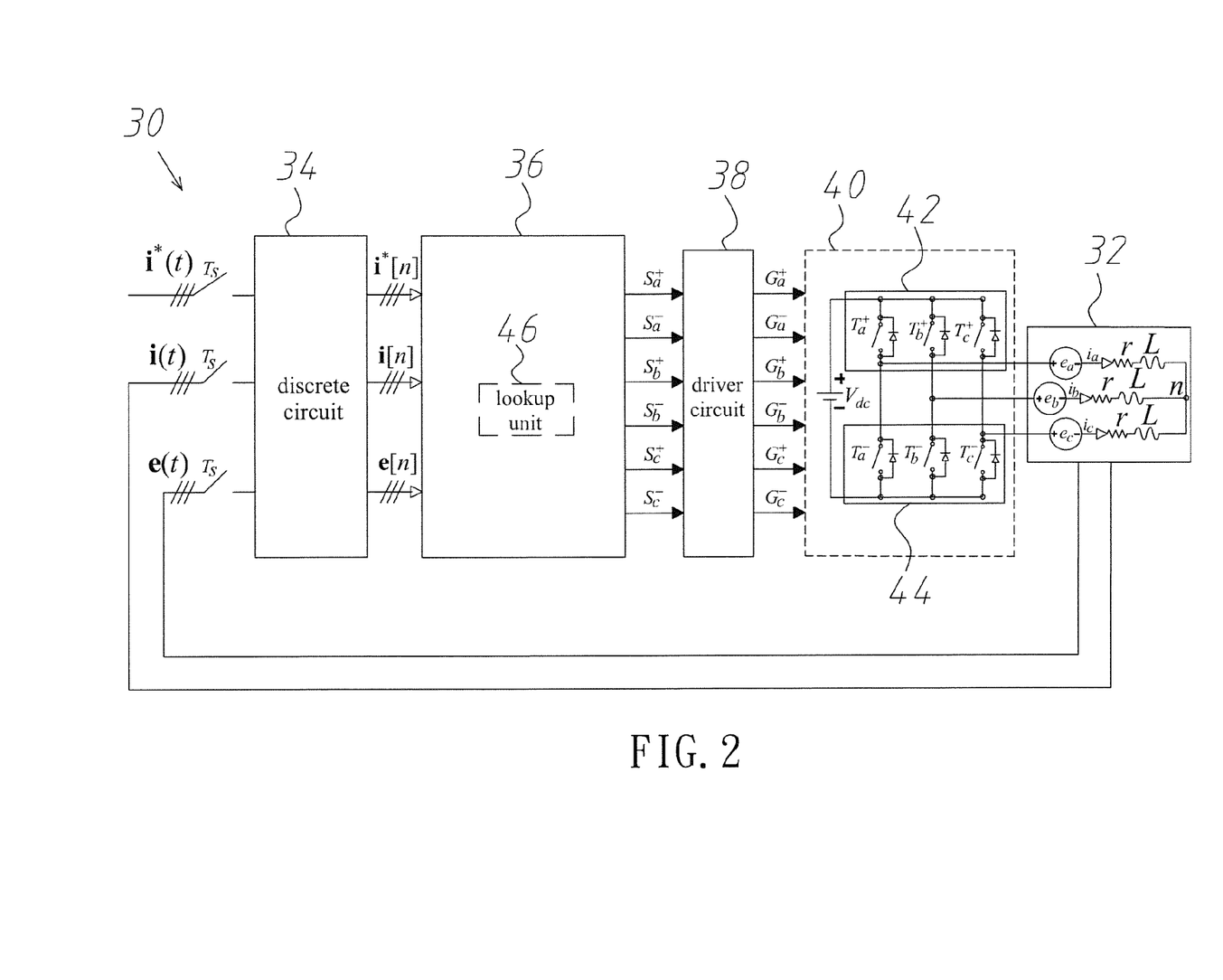
FIG. 2 schematically shows a multi-phase inverter control device according to one embodiment of the present invention.

Refer to FIG. 2 a diagram schematically showing a multi-phase inverter control device according to one embodiment of the present invention. The present invention proposes a multi-phase inverter control device 30, which drives at least one load 32. Herein, a three-phase system is used to exemplify the present invention. As shown in FIG. 2, each phase of the load 32 has a load voltage e, a resistance r, an equivalent load inductance L and connects to a neutral point n. However, the present invention does not limit the type of the load 32. In the present invention, the multi-phase loads are not limited to dispose in a Δ-connected or a Y-connected but may be another type of load.

The load 32 yields CT IOCS i(t) and CT LIVS e(t) in matrix. The multi-phase inverter control device 30 at least comprises a discrete circuit 34, a multi-dimensional quantization circuit 36, a driver circuit 38 and an inverter circuit 40. The inverter circuit 40 electrically connects with the load 32. The discrete circuit 34 receives CT IOCCS i*(t), CT IOCS i(t) and CT LIVS e(t).

The discrete circuit 34 converts the CT IOCCS i*(t), the IOCS i(t) and the CT LIVS e(t) into DT signals in matrix, including DT IOCCS i*[n], DT IOCS i[n], DT LIVS e[n]. The multi-dimensional quantization circuit 36 electrically connects with the discrete circuit 34 and receives the DT IOCCS i*[n], DT IOCS i[n], the DT LIVS e[n]. The multi-dimensional quantization circuit 36 works out an optimized DT IOVS v[n] according to the MDFQCC algorithm, and uses a built-in lookup unit 46 to generate switching signals $S_a^+$-$S_c^-$, and then transmits the switching signals to the driver circuit 38. The driver circuit 38 electrically connects with the multi-dimensional quantization circuit 36. The driver circuit 38 receives the switching signals $S_a^+$-$S_c^-$; and generates switch driving signals $G_a^+$-$G_c^-$ to control the upper arm switch 42 and the lower arm switch 44 of the inverter circuit 40, whereby the inverter circuit 40 generates a voltage across the load 32 and thus CT IOCS are yielded. The load 32 electrically connects with the discrete circuit 34 and the inverter circuit 40.

In this embodiment, the three-phase load 32 is used as an exemplification When the load 32 is a five-phase load, the principle is the same as that of three-phase one. Therefore, it will not repeat herein.

The inverter circuit 40 at least comprises the upper arm switch 42 and the lower arm switch 44. The upper arm switch 42 and the lower arm switch 44 are connected with each other in series and connected with a DC voltage source $V_{dc}$ in parallel. The upper arm switch 42 at least has a phase-A upper arm switch $T_a^+$, a phase-B upper arm switch $T_b^+$, and a phase-C upper arm switch $T_c^+$. The lower arm switch 44 at least has a phase-A lower arm switch $T_a^-$, a phase-B lower arm switch $T_b^-$, and a phase-C lower arm switch $T_c^-$. The phase-A upper arm switch $T_a^+$ is connected with the phase-A lower arm switch $T_a^-$ in series. The phase-B upper arm switch $T_b^+$ is connected with the phase-B lower arm switch $T_b^-$ in series. The phase-C upper arm switch $T_c^+$ is connected with the phase-C lower arm switch $T_c^-$ in series.

Refer to FIG. 2 again. The lookup unit 46 has $2^n$ sets of switching signal configurations as shown in Table.1. As the load is a three-phase one in this embodiment, the lookup unit 46 has $2^3$=8 sets of built-in switching signal configurations. The superscript n is equal to the counts of switches in the upper arm switch 42 or the lower arm switch 44. If the load 32 is a five-phase one, the superscript n is 5. Thus, each of the upper arm switch 42 and the lower arm switch 44 has 5 switches, and the lookup unit 46 has $2^5$=32 sets of built-in switching signal configurations.

The principle of the five-phase case is the same as that of the three-phase case. The individual phase-to-neutral voltages are respectively denoted by $v_{an}$, $v_{bn}$, and $v_{cn}$. For the DT IOVS v[n] of the switching state No. 2, $v_{an}=2/3V_{dc}$, $v_{bn}=-1/3V_{dc}$, $v_{cn}=-1/3V_{dc}$, the phase-A switching signal $S_a^+$ is On, the phase-A switching signal $S_a^-$ Off, the phase-B switching signal $S_b^+$ Off, the phase-B switching signal $S_b^-$ On, the phase-C switching signal $S_c^+$ Off, and the phase-C switching signal $S_c^-$ On.

TABLE 1

| No. | $v_{an}$ | $v_{bn}$ | $v_{cn}$ | $S_a^+$ | $S_a^-$ | $S_b^+$ | $S_b^-$ | $S_c^+$ | $S_c^-$ |
|---|---|---|---|---|---|---|---|---|---|
| 1 | 0 | 0 | 0 | Off | On | Off | On | Off | On |
| 2 | $2/3 V_{dc}$ | $-1/3 V_{dc}$ | $-1/3 V_{dc}$ | On | Off | Off | On | Off | On |
| 3 | $1/3 V_{dc}$ | $1/3 V_{dc}$ | $-2/3 V_{dc}$ | On | Off | On | Off | Off | On |
| 4 | $-1/3 V_{dc}$ | $2/3 V_{dc}$ | $-1/3 V_{dc}$ | Off | On | On | Off | Off | On |
| 5 | $-2/3 V_{dc}$ | $1/3 V_{dc}$ | $1/3 V_{dc}$ | Off | On | On | Off | On | Off |
| 6 | $-1/3 V_{dc}$ | $-1/3 V_{dc}$ | $2/3 V_{dc}$ | Off | On | Off | On | On | Off |
| 7 | $1/3 V_{dc}$ | $-2/3 V_{dc}$ | $1/3 V_{dc}$ | On | Off | Off | On | On | Off |
| 8 | 0 | 0 | 0 | On | Off | On | Off | On | Off |

Figure 3:
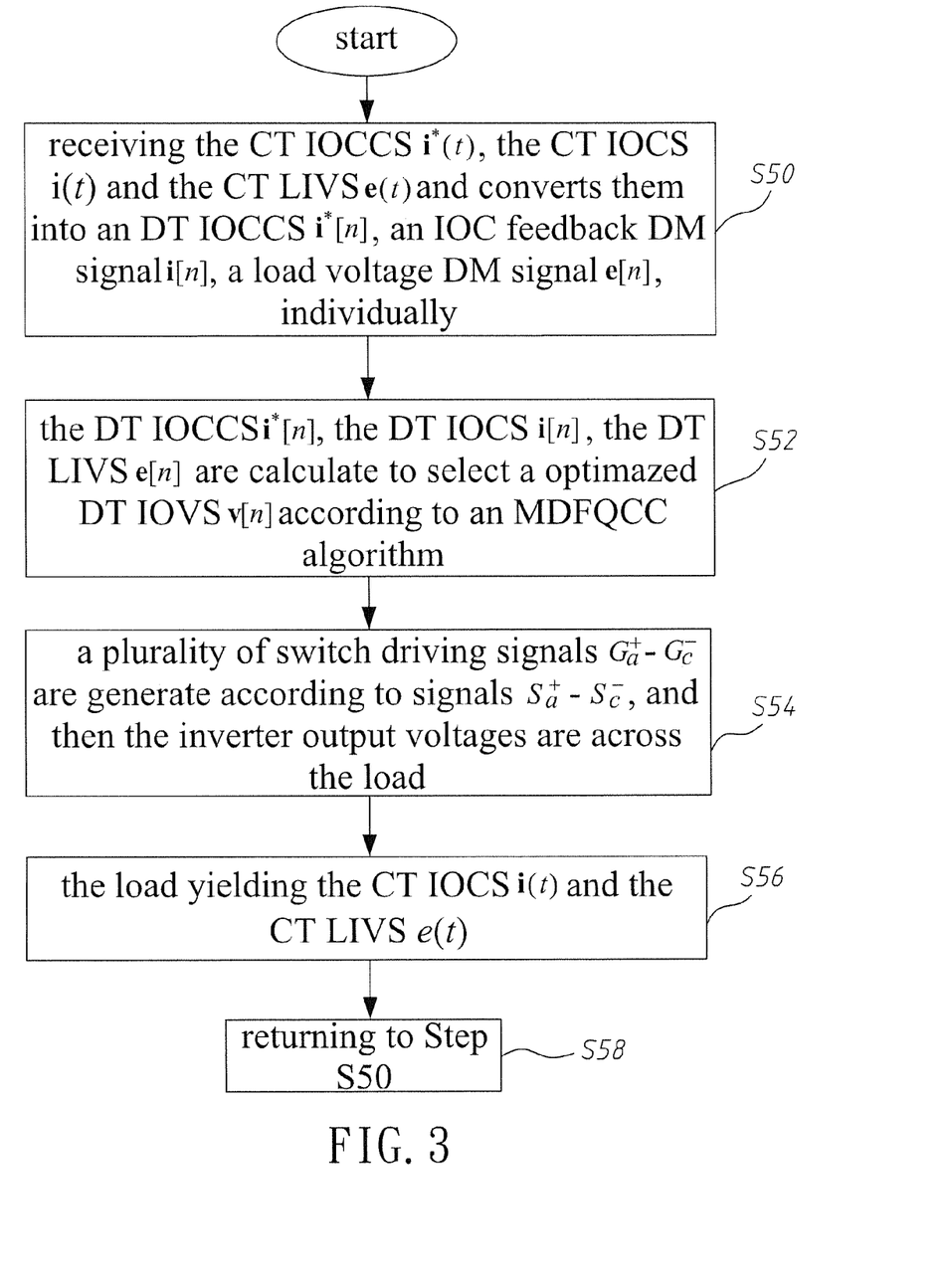
FIG. 3 shows a flowchart of a method for controlling a multi-phase inverter control device according to one embodiment of the present invention.
Figure 4:
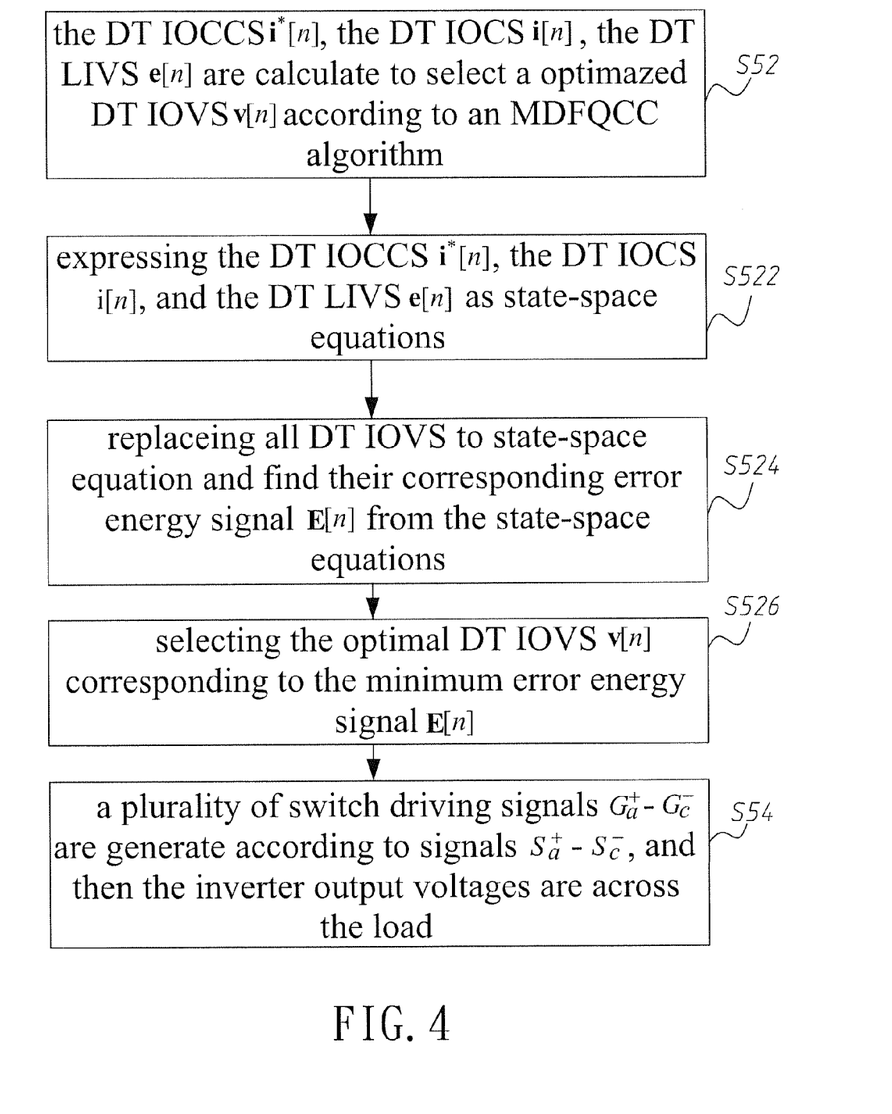
FIG. 4 shows a flowchart of an MDFQCC algorithm according to one embodiment of the present invention.

Refer to FIG. 2 again, and refer to FIG. 3 and FIG. 4 respectively a flowchart of a current control method for a multi-phase inverter control device according to one embodiment of the present invention and a flowchart of an MDFQCC algorithm according to one embodiment of the present invention. The multi-phase control device drives a multi-phase load 32 in a Δ connection or a Y connection, and the load 32 yields CT IOCS i(t) and the CT LIVS e(t). The electric relationship between the inverter output voltage and the inverter output current is expressed by Equation (1) and Equation (2):

$$v(t) = \begin{bmatrix} v_{an}(t) \\ v_{bn}(t) \\ v_{cn}(t) \end{bmatrix} = r \begin{bmatrix} i_a(t) \\ i_b(t) \\ i_c(t) \end{bmatrix} + L \begin{bmatrix} \frac{di_a(t)}{dt} \\ \frac{di_b(t)}{dt} \\ \frac{di_c(t)}{dt} \end{bmatrix} + \begin{bmatrix} e_a(t) \\ e_b(t) \\ e_c(t) \end{bmatrix} \quad (1)$$

$$\Rightarrow v(t) = ri(t) + L\frac{di(t)}{dt} + e(t) \quad (2)$$

wherein t denotes time, r the load-side resistance per phase, $i_a$ the phase-A IOC, $i_b$ the phase-B IOC, $i_c$ the phase-C IOC, L the load-side equivalent inductance per phase, $e_a$ the load-side phase-A inherent voltage, $e_b$ the load-side phase-B inherent voltage, $e_c$ the load-side phase-C inherent voltage, and v(t) the CT IOVS in matrix.

Refer to FIG. 2, FIG. 3 and FIG. 4. The current control method for a multi-phase inverter control device of the present invention comprises the following steps. In Step S50, the discrete circuit 34 receives the CT IOCCS i*(t), the CT IOCS i(i) and the CT LIVS e(i) and converts them into an DT IOCCS i*[n], an IOC feedback DM signal i[n], a load voltage DM signal e[n], individually. In Step S52, the DT IOCCS i*[n], the DT IOCS i[n], the DT LIVS e[n] are calculated to select a optimazed DT IOVS v[n] according to an MDFQCC algorithm.

Refer to FIG. 4. The MDFQCC algorithm comprises the following steps. In Step S522, express the DT IOCCS i*[n], the DT IOCS i[n], and the DT LIVS e[n] as state-space equations. In Step S524, replace all DT IOVS to state-space equation and find their corresponding error energy signal E(n) from the state-space equations. In Step S526, select the optimal DT IOVS v[n] corresponding to the minimum error energy signal E(n). The state-space equations are respectively expressed by Equations (3) and (4):

$$x[n+1] = A \cdot x[n] + B \cdot i^*[n] - B \cdot i[n-1] + \frac{T_s}{L} B \cdot (e[n] - v[n]) \quad (3)$$

$$E(n) = v[n]\left(2D \cdot i[n-1] - 2C \cdot x[n] - 2D \cdot i^*[n] + \frac{T_s}{L} D \cdot v[n] + 2\frac{T_s}{L} D \cdot e[n]\right) \quad (4)$$

wherein x[n] is a 3m×1 state variable matrix, A, B, C and D respectively 3m×3m parameter matrixes (m is a positive integer), i*[n] DT IOCCS, i[n] DT IOCS, $T_s$ the sampling period, L the load-side equivalent inductance per phase, e[n] DT LIVS, v[n] DT IOVS, and E(n) the error energy signals. The DT IOVS v[n] can be expressed with the phase-A output voltage $v_{an}$, the phase-B output voltage $v_{bn}$, the phase-C output voltage $v_{cn}$. The lookup table regarding to the switching signals $S_a^+$-$S_c^-$ are built in the unit 46. In Step S52, the switching signals $S_a^+$-$S_c^-$ corresponding to the minimum error energy signal E(n) are determined, which is found out from the switching signal configurations built in the lookup unit 46. Next, in Step S54, a plurality of switch driving signals $G_a^+$-$G_c^-$ are generated according to signals $S_a^+$-$S_c^-$, and then the inverter output voltages are across the load 32. Next, in Step S56, the load 32 yields the CT IOCS i(t) and the CT LIVS e(t). In Step S58, the process returns to Step S50.

Figure 5:
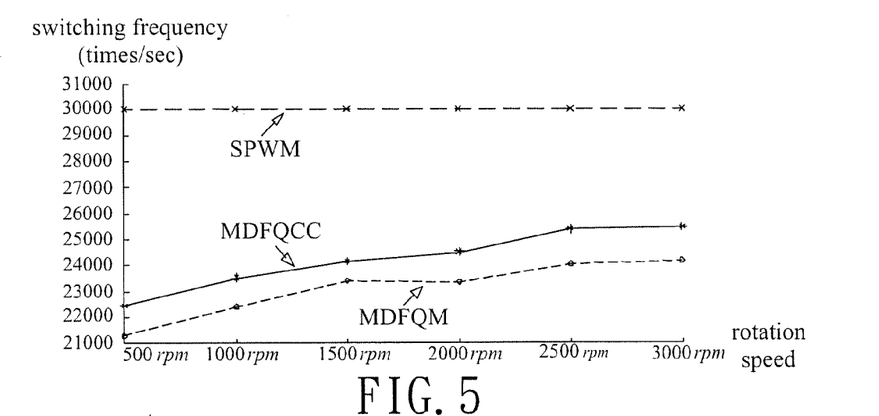
FIG. 5 shows the comparison of the switching frequencies of the SPWM system, the MDFQM system and the MDFQCC system of the present invention.
Figure 6:
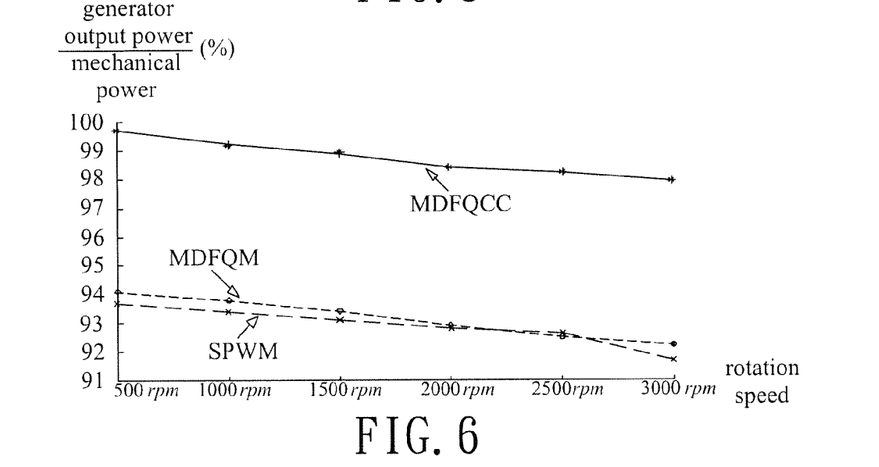
FIG. 6 shows the comparison of the energy conversion efficiencies of the SPWM system, the MDFQM system and the MDFQCC system of the present invention.
Figure 7:
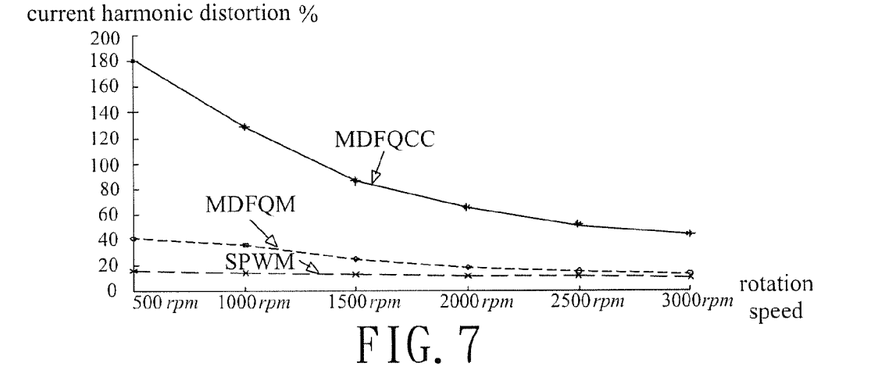
FIG. 7 shows the harmonic distortions of the SPWM system, the MDFQM system and the MDFQCC system.

Refer to FIG. 5, FIG. 6 and FIG. 7 for comparisons of the switching frequencies, conversion efficiencies and harmonic distortions of the SPWM system, the MDFQM system and the MDFQCC system. FIG. 5 is a diagram showing the switching frequencies of the SPWM system, the MDFQM system and the MDFQCC system at a load of 100Ω. FIG. 6 is a diagram showing the energy conversion efficiencies that the three-phase inverters of the SPWM system, the MDFQM system and the MDFQCC system output energy to a generator with a load of 100Ω. FIG. 7 is a diagram showing the harmonic distortions of the SPWM system, the MDFQM system and the MDFQCC system. As to the load and control parameters, the frequency of the triangular wave of the SPWM system can be adjusted according to user's requirement, wherein the switching frequency must be taken into consideration. The MDFQCC system of the present invention system and the MDFQM do not have triangular wave, but the operating frequency takes the place of triangular wave. The operating frequency is set to be n times the frequency of the triangular wave, i.e. $f_s=nf_{tri}$. In simulation, neither the upper and lower arm switches turn on simultaneous, nor the current rises abruptly. Therefore, the multi-phase switches would not be damaged by the abruptly rising current in simulation. However, a dead time mechanism is still added to the system in practical application to prevent from switch damage. The simulations of the MDFQCC system of the present invention and the MDFQM system are mainly addressed to the stable states of the loads. The current waveforms are recorded at different stable-state rotation speeds, including 500, 1000, 1500, 2000, 2500, and 3000 rpm. It is observed in FIG. 5: the conventional MDFQM system has the smallest switching frequency; the conventional SPWM system has the largest switching frequency. Therefore, the MDFQCC system of the present invention has smaller switching loss than the conventional SPWM system. It is observed in FIG. 6 that the MDFQCC system of the present invention has the highest energy conversion efficiency when the driver circuit outputs energy to the load resistor. The reason why the MDFQCC system of the present invention has the highest energy conversion efficiency is that the MDFQCC system of the present invention does not adopt the PI controller to undertake current following and thus has better phase following performance. Therefore, the MDFQCC system of the present invention can use less input power to provide the same power for the load to achieve the same rotation speed than the other two systems. Further, as the MDFQCC system of the present invention does not use the PI controller, it consumes less computation resource than the other two three-phase current control systems. As shown in FIG. 7, the three systems are ranked according to the total current harmonic distortions as follows: the MDFQCC system>the MDFQM system>the SPWM system. The total current harmonic distortion of the MDFQCC system of the present invention can be improved via varying the parameters A, B, C and D.

In conclusion, the present invention discloses a multi-phase inverter control device, which uses a discrete circuit and a multi-phase quantization circuit to process signals to obtain the optimal switching signals and reduce the harmonic distortion of the output of the multi-phase inverter control device, the switching frequency and decreases the power consumption in the operation of the multi-phase inverter control device.

The embodiments described above are only to exemplify the present invention but not to limit the scope of the present invention. Any equivalent modification or variation according to the spirit of the present invention is to be also included within the scope of the present invention, which is based on the claims stated below.

What is claimed is:

1. A multi-phase inverter control device, which is used to output voltages across at least one load that yields a continuous-time (CT) inverter output current signal (IOCS) in matrix and feeds a CT load-side inherent voltage signals (LIVS), comprising
a discrete circuit receiving a CT inverter output current command signal (IOCCS), said CT IOCS and said CT LIVS, and converting them into a plurality of discrete-time (DT) signals;
a multi-dimensional quantization circuit electrically connecting with said discrete circuit, receiving said DT signals, and calculating according to an MDFQCC (Multi-Dimensional Feedback Quantization Current Control) algorithm to obtain a DT inverter output voltage signal (IOVS) for determining a plurality of switching signals;
a driver circuit electrically connecting with said multi-dimensional quantization circuit, receiving said switching signals, and converting said switching signals into a plurality of switch driving signals; and
an inverter circuit electrically connecting said driver circuit and said load, and receiving said switch driving signals to drive said load, whereafter said load yields said CT IOCS and said CT LIVS to said discrete circuit;
wherein said DT signals include a DT IOCCS, a DT IOCS, and a DT LIVS, and wherein said discrete circuit receives said CT IOCCS, said CT IOCS and said CT LIVS, and converts them into said DT IOCCS, said DT IOCS, and said DT LIVS, respectively.

2. The multi-phase inverter control device according to claim 1, wherein said inverter circuit at least comprises an upper arm switch and a lower arm switch, and wherein said upper arm switch and said lower arm switch are connected with each other in series, and wherein there are $2^n$ sets of switching signal configurations, and wherein n is a superscript and equal to a count of switches in said upper arm switch or said lower arm switch.

3. The multi-phase inverter control device according to claim 2, wherein said multi-dimensional quantization circuit has a built-in lookup unit containing $2^n$ sets of switching signal configurations.

4. The multi-phase inverter control device according to claim 1, wherein said load is in a Δ connection or a Y connection.

5. A current control method for a multi-phase inverter control device that is used to output voltages across at least one load yielding a continuous-time (CT) inverter output current signal (IOCS) in matrix and feeds a CT load-side inherent voltage signals (LIVS), comprising
Step (A): receiving a continuous-time (CT) inverter output current command signals (IOCCS), said CT inverter output current signal (IOCS) and said CT load-side inherent voltage signals (LIVS), and converting them into a plurality of discrete-time (DT) signals;
Step (B): converting said DT signals into a DT inverter output voltage signal (IOVS) to determine a plurality of switching signals according to an MDFQCC (Multi-Dimensional Feedback Quantization Current Control) algorithm;
Step (C): generating a plurality of switch driving signals according to said switching signals, and then generating an inverter output current to determine a switching signal configuration in a lookup unit for driving said load; and
Step (D): said load yielding said CT IOCS and said CT LIVS, and then returning to Step (A);
wherein said DT signals include DT IOCCS, DT IOCS, and DT LIVS, and wherein in said Step (A), said CT IOCCS, said CT IOCS and said CT LIVS are received and respectively converted into said DT IOCCS, said DT IOCS, and said DT LIVS.

6. The current control method for a multi-phase inverter control device according to claim 5, wherein said MDFQCC algorithm includes
Step (a): expressing said DT IOCCS, said DT IOCS, and said DT LIVS as state-space equations;
Step (b): finding a corresponding minimum error energy signal from said state-space equations; and
Step (c): generating said DT IOVS corresponding to said minimum error energy signal.

7. The current control method for a multi-phase inverter control device according to claim 6, wherein said state-space equations are expressed as $$x[n+1] = A \cdot x[n] + B \cdot i^*[n] - B \cdot i[n-1] + \frac{T_s}{L} B \cdot (e[n] - v[n])$$

$$E(n) = v[n]\left(2D \cdot i[n-1] - 2C \cdot x[n] - 2D \cdot i^*[n] + \frac{T_s}{L} D \cdot v[n] + 2\frac{T_s}{L} D \cdot e[n]\right)$$

wherein x[n] is a 3m×1 state variable matrix, A, B, C and D respectively 3m×3m parameter matrixes (m is a positive integer), i*[n] said DT IOCCS, i[n] said DT IOCS, $T_s$ a sampling period, L a load-side equivalent inductance per phase, e[n] said DT LIVS, v[n] said DT IOVS, and E(n) said error energy signal.

8. The current control method for a multi-phase inverter control device according to claim 6, wherein said Step (b) further comprises finding said minimum error energy signal according to several switching signal configurations of said lookup unit to determine said switching signals when said DT IOCCS, said DT IOCS, and said DT LIVS are expressed as said state-space equations.

* * * * *